United States Patent Office 3,489,795
Patented Jan. 13, 1970

3,489,795
PREPARATION OF TERTIARY ALKYL LEVULINATES
George Gal, 17 Elm Place, Summit, N.J. 07901, and Meyer Sletzinger, 135 Rockview Ave., North Plainfield, N.J. 07060
No Drawing. Original application Dec. 28, 1962, Ser. No. 247,822, now abandoned. Divided and this application Jan. 13, 1964, Ser. No. 343,432
Int. Cl. C07c 69/66
U.S. Cl. 260—483                    4 Claims

ABSTRACT OF THE DISCLOSURE

This invention relates to novel gamma keto acid tertiary esters and to processes for their preparation. These processes comprise reacting a gamma keto acid chloride with an alkali tertiary alkoxide or with a tertiary alkanol in the presence of a halogen acid acceptor. The gamma keto acid tertiary esters are useful as chemical intermediates in the preparation of α-(3-indolyl)aliphatic acids acylated in the N—1 position of the indole nucleaus wiht groups. The latter compounds are potent anti-inflammatory agents.

This application is a division of our copending application, S.N. 247,822, filed Dec. 28, 162, and now abandoned.

This invention relates to a novel process for the preparation of tertiary esters of indolyl aliphatic acids, which compounds are useful as chemical intermediates. The invention is also concerned with novel gamma keto acid tertiary esters used in preparing said tertiary esters of indolyl aliphatic acids, and to methods of preparing said gamma keto acid tertiary esters. More particularly, the invention relates to a novel process of preparing tertiary α-(3-indolyl)aliphatic acid esters from novel gamma keto acid tertiary esters, which process comprises treating an acid salt of phenylhydrazine or a substituted phenylhydrazine with a gamma keto acid tertiary ester in the absence of an added catalyst.

The tertiary α-(3-indolyl)aliphatic acid esters that may be prepared in accordance with the process of this invention have the general structural formula:

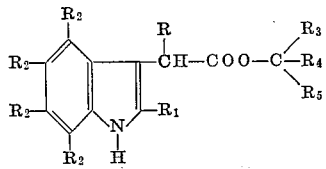

wherein R and $R_1$ are selected from the group consisting of a hydrogen atom and lower alkyl radicals; $R_2$ is selected from the group consisting of hydrogen and halogen atoms, and lower alkyl, lower alkoxy, halogenated alkyl, hydroxy, nitro, cyano, amino, substituted amino, aminomethyl, substituted aminomethyl, dialkylsulfonamido, mercapto and alkylmercapto radicals; and $R_3$, $R_4$ and $R_5$ are selected from the group consisting of alkyl, alkoxyalkyl, aralkyl, aryl and alkaryl radicals, $R_3$ and $R_4$ together with the tertiary ester carbon atom furthermore standing for a member selected from the group consisting of cycloalkyl and cycloalkenyl radicals, in which case, $R_5$ is a lower alkyl radical.

The α-(3-indolyl)aliphatic acids and the corresponding esters thereof, acylated in the N—1 position of the indole nucleus with aroyl groups such as benzoyl and naphthoyl radicals, have been found to be potent antiinflammatory agents. The preparation of these materials generally involves the acylation of an indolyl acid ester that is unsubstituted in the N—1 position to to form an N-acylated indolyl acid ester from which the free acid can be obtained. It has been observed, however, that the N-acyl group is hydrolyzed and, therefore, lost under conditions normally employed for the saponification of the ester to the free acid. For this reason, care must be taken in converting the N-acylated indolyl acid esters to the corresponding free acids. One convenient method of accomplishing this conversion comprises acylation of the tertiary esters of N-substituted indolyl acids, since the resulting tertiary N-acylated indolyl acid esters can be transformed into the free N-acylated indolyl acids by pyrolysis without substantially causing the removal of the N-acyl group. The subject invention, therefore, provides a simple, convenient method of preparing tertiary esters of N-unsubstituted indolyl acids which, after acylation of the N—1 position, can easily be converted to the corresponding free acids.

The most important general method for the formation of indole derivatives is the Fischer indole synthesis which involves the elimination of ammonia from the phenylhydrazones, or substituted phenylhydrazones, of a great variety of aldehydes, ketones or ketonic acids. Accordingly, phenylhydrazine, or a substituted phenylhydrazine, is condensed with an appropriate carbonyl compound to form a corresponding phenylhydrazone, followed by the intramolecular condensation of said phenylhydrazone to form the corresponding indole. It is essential that the intramolecular condensation reaction be performed in the presence of an acidic catalyst, such as, for example, zinc chloride, alcoholic hydrochloric acid, dilute sulfuric acid or glacial acetic acid. Because of the required acid catalyst in the Fischer synthesis, however, it is not possible to prepare tertiary esters of α-(3-indolyl)aliphatic acids from the phenylhydrazones of gamma keto acid tertiary esters, since the acidic medium decomposes the gamma keto acid tertiary esters into the corresponding gamma keto acids.

It has now been found that the foregoing tertiary esters of α(3-indolyl)aliphatic acids can be prepared in a simple one-step method, to wit, by reacting directly, in the absence of an added catalyst, a mixture of an acid salt of phenylhydrazine or substituted phenylhydrazines having at least one unsubstituted ortho position, the chemical structure of which may be represented as follows:

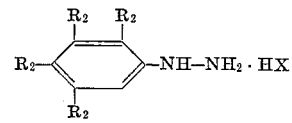

wherein $R_2$ is as previously defined and more fully described hereinafter and HX represents the acid component, and a novel gamma keto acid tertiary ester of the structure:

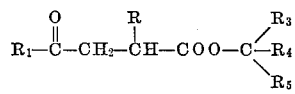

wherein R, $R_1$, $R_3$, $R_4$ and $R_5$ are as previously defined and more fully described hereinafter. This reaction of phenylhydrazine acid salts with gamma keto acid tertiary esters in a substantially neutral medium may be illustrated by the following equation:

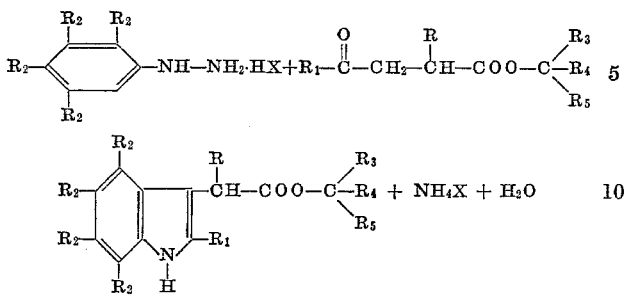

The foregoing reaction is carried out in an organic solvent having, preferably, a boiling point over 50° C. Among the preferred organic solvents that are operable herein are aromatic hydrocarbons, such as, for example, benzene, toluene, xylene, and the like, and aliphatic alcohols, such as, for example, methanol, ethanol, isopropanol, tert-butanol, sec-pentanol, and the like as well as mixtures of said aromatic hydrocarbons and said aliphatic alcohols. The reaction is advantageously conducted at ambient temperatures although reflux conditions and temperatures above 50° C. are preferred. Stoichiometric quantities (i.e., equimolar) are advantageously employed although a molecular excess of about 10–50 percent of the gamma keto acid tertiary ester is preferred. The resulting ammonium salt is separated from the reaction mixture and the desired product obtained by conventional laboratory techniques.

The subject process has been found to be particularly suitable for the preparation of tertiary $\alpha$-(3-indolyl) aliphatic acid esters having the formula:

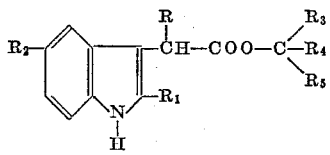

wherein R, $R_1$, $R_2$, $R_3$, $R_4$ and $R_5$ are as defined above, in which case, the starting phenylhydrazine acid salts that are employed must be substituted in the para-position when $R_2$ is a group other than hydrogen.

The phenylhydrazine acid salts that are utilized herein are derived from the interaction of the corresponding phenylhydrazine with an acid (HX) having an ionization constant of at least $10^{-5}$, such as, for example, hydrochloric acid, hydrobromic acid, oxalic acid and acetic acid, the preferred acid being hydrochloric acid. In general, said phenylhydrazines are well known and may be prepared by conventional techniques, such as, for example, the diazotization of the correspondingly substituted aniline with subsequent reduction of the resulting diazo compound.

The substituents represented by $R_2$, which may be the same radical or different radicals, on the phenylhydrazine acid salts are, preferably, lower alkyl, lower alkoxy, nitro, amino and substituted amino groups. Examples of said alkyl and alkoxy radicals are the methyl, ethyl, propyl, tertiary butyl, methoxy, ethoxy, isopropoxy and the like radicals. Examples of said substituted amino radicals are those derived from alkyl amines such as methylamine, ethylamine, dimethylamine, diethylamine and the like; alkanolamines such as ethanolamine, diethanolamine, 2-amino-1-butanol, morpholine and the like; aryl amines such as aniline, diphenylamine and the like; mixed aromatic-aliphatic amines such as monomethylaniline, monoethylaniline and the like; aralkyl amines such as benzylamine, $\beta$-phenylethylamine and the like; halo-substituted aliphatic or aromatic amines such as $\beta$-chloroethylamine, parachloroaniline, para-chlorobenzyl amine and the like; and other substituted aliphatic or aromatic amines such as $\beta$-methoxy ethylamine, para-tolyl amine, para-methoxy aniline, and the like. $R_2$ is not limited to the foregoing class of substituents, however, and may also represent such substituents as a hydrogen atom; a halogen atom, preferably fluorine; a halogenated alkyl radical, preferably trifluoromethyl; a hydroxy radical; a cyano radical; an aminomethyl; an alkyl substituted aminomethyl radical; a dialkylsulfonamido radical, preferably dimethylsulfonamido; a mercapto radical; and an alkyl mercapto radical. Typical examples of polysubstituted phenylhydrazine acid salts that are operable herein include the acid salts (e.g., the hydrochloride) of 2 - chloro-5-methoxyphenylhydrazine, 2-chloro-4-methoxyphenyl-hydrazine, 2,4-dimethylphenylhydrazine, 3 - methyl-4-methoxyphenylhydrazine, 2-chloro-5-methylphenylhydrazine, $\beta$-naphthylhydrazine, 2-chloro-4,5-dimethylphenylhydrazine and the like.

In the novel gamma keto acid tertiary esters of this invention, R and $R_1$ may represent hydrogen atoms or lower alkyl radicals containing up to and including eight carbon atoms although alkyl radicals containing from one to four carbon atoms are preferred, such as, for example, methyl, ethyl, propyl and butyl radicals. The $R_3$, $R_4$ and $R_5$ constituents, attached to the tertiary ester carbon atom, are selected from the group consisting of alkyl radicals, e.g., the lower alkyls containing up to and including eight carbon atoms such as methyl, ethyl, propyl, butyl, octyl, cyclopentyl, cyclohexyl, and the like; alkoxyalkyl radicals, e.g., the lower-alkoxy-alkyls such as methoxymethyl, ethoxymethyl, methoxyethyl, and the like; aralkyl radicals, e.g., benzyl, phenethyl, and the like; aryl radicals of the benzene series such as phenyl and biphenylyl; and alkaryl radicals, e.g., the lower-alkyl substituted phenyls such as tolyl and p-ethylphenyl. Said $R_3$, $R_4$ and $R_5$ constituents may be the same radical or different radicals, although, in the preferred embodiments of this invention, at least one of said $R_3$, $R_4$ and $R_5$ is a lower alkyl radical. Furthermore, $R_3$ and $R_4$ together with the tertiary ester carbon atom may represent cycloalkyl radicals such as, for example, cyclopentyl and cyclohexyl, and cycloalkenyl radicals such as, for example, 2-cyclopentenyl, 3-cyclopentenyl, 2-cyclohexenyl, and 3-cyclohexenyl, in which case, $R_5$ is a lower alkyl radical, preferably methyl.

A method of preparing gamma keto acid tertiary esters, which have at least one alkyl, alkoxyalkyl or aralkyl radical attached to the tertiary ester carbon atom, is by treating a keto acid having the formula:

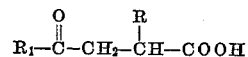

wherein R and $R_1$ are as previously defined, with a tertiary olefin under acidic conditions, said tertiary olefin having the formula:

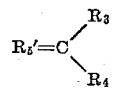

wherein $R_3$ and $R_4$ are as previously defined and $R_5'$ is an alkyl, alkoxyalkyl or aralkyl precursor, that is, a radical attached to the tertiary carbon atom by means of an alkylenyl linkage and capable of becoming an $R_5$ radical of the alkyl, alkoxyalkyl or aralkyl type upon the addition of a hydrogen atom. The reaction may be represented by the following equation:

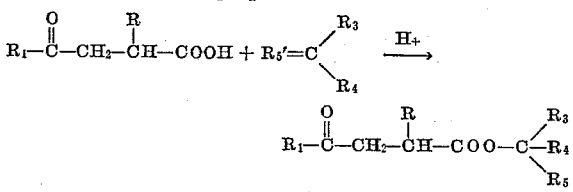

The use of a solvent is not critical and the reaction may be conducted in the absence thereof. Preferably, however, the keto acid is reacted with the tertiary olefin in the presence of an organic solvent, such as, for example, methylene chloride, chloroform, benzene, dioxane and the like. Stoichiometric quantities (i.e., equimolar) are advantageously employed although a molecular excess of about 10–50 percent of the tertiary olefin is preferred. The reaction is advantageously conducted at about 25 degrees centigrade although other temperatures from 0° C. to 40° C. can be employed. The reaction is generally completed between 20 to 70 hours, longer periods being required for the lower reaction temperatures and/or less reactive olefins. When the tertiary olefin is a gas in its normal state, e.g., isobutylene, atmospheric pressure and temperatures ranging from 0° C. to 20° C. are advantageous although it is preferred to operate under a pressure of about 10–30 pounds per square inch gauge and temperatures of from 20° C. to 40° C. The reaction should be conducted under acidic conditions and acid catalysts, such as, for example, sulfuric acid, paratoluenesulfonic acid, meta-xylene-sulfonic acid, methane-sulfonic acid and the like are advantageously employed. At the end of the reaction period, the acidic catalyst is neutralized as, for example, by treating the reaction mixture with a cold aqueous solution of a base (e.g., sodium hydroxide, sodium bicarbonate, sodium carbonate, etc.). The product may then be recovered and isolated by conventional laboratory techniques such as, for example, by vacuum distillation if a liquid, or by crystallization if a solid.

The foregoing reaction conditions may also be utilized in preparing those gamma keto acid tertiary esters wherein $R_3$ and $R_4$, together with the tertiary ester carbon atom, constitute a cycloalkyl or cycloalkenyl radical, and $R_5$ is a lower alkyl radical. Accordingly, the desired keto acid may be heated with alkylene cycloalkanes such as methylene cyclopentane, methylene cyclohexane and the like, or, with alkylene cycloalkenes such as methylene 2-cyclopentene, methylene 2-cyclohexene, methylene 3-cyclohexene and the like. The use of an alkyl cycloalkene-1, such as methyl cyclopentene-1, methyl cyclohexene-1 and the like, may also be employed, in which case, the same product as that which is obtained from the utilization of the corresponding alkylene cycloalkanes will be obtained. For example, the interaction of a keto acid with methylene cyclohexane and with methyl cyclohexene-1 may be illustrated as follows:

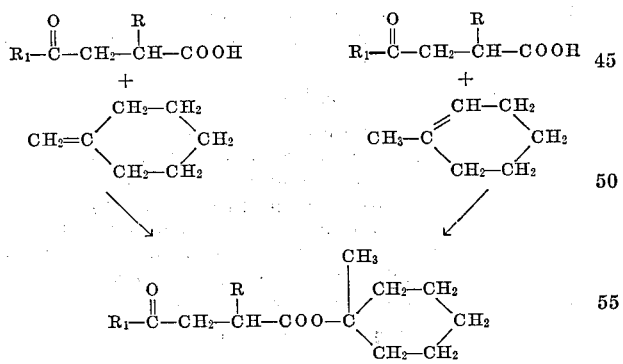

An alternative method of preparing gamma keto acid tertiary esters, wherein each of $R_3$, $R_4$ and $R_5$ is an alkyl radical, such as, for example, t-butyl levulinate, is by the interaction of the corresponding keto acid chloride with an alkali tertiary alkoxide in anhydrous benzene, which reaction may be represented by the following equation:

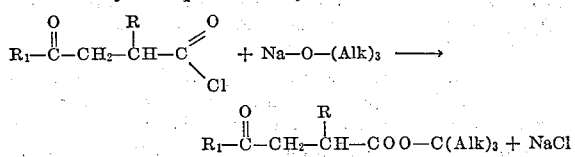

The resulting alkali chloride salt is filtered off, the benzene solution washed with aqueous sodium bicarbonate and water, and the desired tertiary alkyl ester recovered by conventional laboratory techniques, e.g., by vacuum distillation.

Another method of preparing tertiary alkyl gamma keto acid esters is by the interaction of the corresponding keto acid chloride with a tertiary alkanol in the presence of a halogen acid acceptor, which reaction may be represented by the following equation:

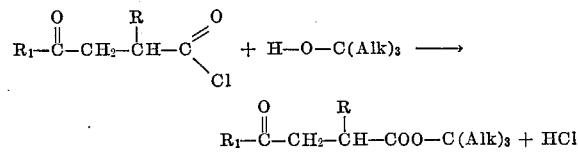

This reaction may be carried out in inert organic liquids such as benzene, ether and carbon tetrachloride under anhydrous conditions. The preferred halogen acid acceptors are organic liquids having a tertiary amine-like structure. They may be heterocyclic, such as N-alkyl piperidine, N-alkyl morpholine, pyridine, lutidine, or quinoline; aliphatic amines such as triethyl amine, tributyl amine or, in general, trialkyl amines; dialkyl aromatic amines such as diethyl aniline or dimethyl aniline. The term "halogen acid acceptor" as used herein means those compounds which may be added to the reaction mixture to combine or react with the halogen acid that is formed during the progress of the reaction so that the equilibrium of the reaction is shifted in a manner favoring completion of the reaction. The amount of halogen acid acceptor that may be employed is not critical, but, for optimum conditions, the theoretical number of moles of halogen acid liberated during the course of the reaction can easily be calculated and, thus, the corresponding amount of halogen acid acceptor that need be employed can readily be determined. The halogen acid acceptor need not be soluble in the organic solvent.

The gamma keto acid tertiary esters, wherein each of $R_3$, $R_4$ and $R_5$ is an aryl or alkaryl radical, may be prepared by treating a salt of the corresponding gamma keto acid, preferably the silver or ammonium salt, with a triarylated halomethane in benzene under anhydrous conditions. The arylated halomethane may be represented by the formula $(Ar)_3CX$, wherein Ar is a member selected from the group consisting of aryl and alkaryl radicals and X is a halogen atom, preferably bromine. The reaction may be illustrated by the following equation:

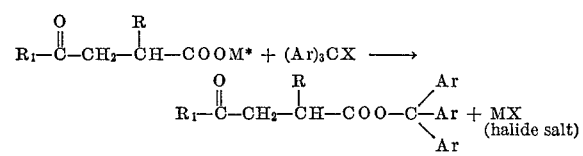

*M=cation, e.g., $Ag^+$, $NH_4^+$, and the like.

The resulting halide salt is removed by conventional laboratory techniques, e.g., filtration, the benzene solution concentrated in vacuo, and the residue dissolved in an organic solvent such as petroleum ether from which the desired gamma keto acid tertiary ester is crystallized.

The following examples illustrate methods of carrying out the present invention but it is to be understood that these examples are given for purposes of illustration and not of limitation.

EXAMPLE 1

Preparation of tertiary butyl levulinate (A) A mixture of 128.7 gms. of dry levulinic acid and 91.5 gms. of isobutylene in 224 ml. of methylene chloride containing a catalytic amount of sulfuric acid (1.09 ml.) is allowed to stand for 64 hours in a closed vessel. The reaction mixture is then poured into aqueous sodium bicarbonate at 0 to 5° C. The organic phase is separated, dried, concentrated in vacuo and the residue subjected to vacuum distillation. The product t-butyl levulinate, is obtained in 88% yield (B.P.=72–74° C. at 2 mm.).

(B) 13.4 grams of levulinyl chloride is reacted with 11.3 gms. of potassium tertiary butoxide in anhydrous benzene for 12 hours at room temperature (about 25° C.). Potassium chloride, which forms during the course of the reaction, is filtered off and the benzene layer is washed with aqueous sodium bicarbonate and water. Vacuum distillation of the benzene layer affords the product, t-butyl levulinate.

(C) 6.9 grams of levulinyl chloride are added to a mixture of 4.0 gms. of tertiary butanol and 7.9 gms. of pyridine in 50 ml. of anhydrous benzene at 10° C. After standing overnight at 20° C., the mixture is poured into 100 ml. of cold water (about 5° C.). The residue pyridine and acid are removed by 2 washings with 20 ml. of 50% aqueous acetic acid, followed by water, then with sodium bicarbonate solution, and, finally, additional water. The product, t-butyl levulinate, is obtained by vacuum distillation.

EXAMPLE 2

Preparation of triphenylmethyl levulinate 32.3 grams of triphenyl-bromomethane are reacted with 13.3 gms. of dry ammonium levulinate in anhydrous benzene with stirring for 10 hours. The ammonium bromide, which forms during the course of the reaction, is filtered off, the benzene solution concentrated in vacuo, and the residue dissolved in petroleum ether from which the product, triphenylmethyl levulinate, crystallizes.

EXAMPLE 3

A. Preparation of t-butyl 2-methyl-5-methoxy-3-indolylacetate

A mixture of 11.4 gms. (0.1 mole) of p-methoxyphenylhydrazine-HCl and 20.0 g. (0.016 mole) of t-butyl levulinate in 150 ml. of t-butanol is refluxed under nitrogen for 5 hours and then cooled to 25° C. The resulting ammonium chloride (5.3 gms.) is filtered off. The solvent is removed in vacuo and the residual oil dissolved in 150 ml. of methylenechloride and filtered through an acid washed alumina column. The yellow colored solution is concentrated to a syrup and 100 ml. of cyclohexane is added. The mixture is aged for one hour at 10° C., filtered and washed with a 1:1 mixture of cyclohexane and petroleum ether, and dried in vacuo to yield 22.3 gms. of the tertiary butyl ester of 2-methyl-5-methoxy-3-indolylacetic acid (M.P.=111–112° C.).

B. Preparation of t-butyl 2-methyl-5-alkoxy-3-indolylacetates:

In accordance with the procedure of Example 3A but starting, respectively, with an equivalent quantity of p-butoxy, p-propoxy, and p-ethoxy substituted phenylhydrazine hydrochloride, in lieu of the p-methoxyphenylhydrazine hydrochloride, there are obtained as products the respective tertiary butyl esters of the corresponding 2-methyl-5-alkoxy-3-indolylacetic acids.

EXAMPLE 4

The procedure of Example 3A is followed using an equivalent quantity of phenylhydrazine hydrochloride in place of the p-methoxyphenylhydrazine hydrochloride to produce 2-methyl-3-indolylacetic acid t-butyl ester.

EXAMPLE 5

The procedure of Example 3A is followed using an equivalent quantity of p-fluorophenylhydrazine hydrochloride in place of p-methoxyphenylhydrazine hydrochloride to produce 2-methyl-5-fluoro - 3 - indolylacetic acid t-butyl ester.

Similarly, the use of an equivalent quantity of p-trifluoromethylhydrazine hydrochloride in place of p-methoxyphenylhydrazine hydrochloride affords the corresponding 2-methyl-5-trifluoromethyl-3-indolylacetic acid t-butyl ester.

EXAMPLE 6

The procedure of Example 3A is followed using an equivalent quantity of p-methylphenylhydrazine hydrochloride in place of p-methoxyphenylhydrazine hydrochloride to produce 2,5-dimethyl-3-indolylacetic acid t-butyl ester.

Similarly, the use of equivalent quantities of p-ethylphenylhydrazine hydrochloride and p-butylphenylhydrazine hydrochloride, respectively, in place of p-methoxyphenylhydrazine hydrochloride affords the corresponding 2-methyl-5-alkyl-3-indolylacetic acid t-butyl ester.

EXAMPLE 7

The procedure of Example 3A is followed using an equivalent quantity of p-dimethylaminophenylhydrazine hydrochloride in place of p-methoxyphenylhydrazine hydrochloride to produce 2-methyl-5-dimethylamino-3-indolyl-acetic acid t-butyl ester.

Similarly, the use of equivalent quantities of p-dimethylsulfonaminophenylhydrazine hydrochloride and p-diethylaminophenylhydrazine hydrochloride, respectively, in place of p-methoxyphenylhydrazine hydrochloride, affords the corresponding 2-methyl-5-substituted-3-indolylacetic acid t-butyl esters.

EXAMPLE 8

The procedure of Example 3A is followed using an equivalent quantity of p-nitrophenylhydrazine hydrochloride in place of p-methoxyphenylhydrazine hydrochloride to produce 2-methyl-5-nitro-3-indolylacetic acid t-butyl ester.

Similarly, the use of an equivalent quantity of p-cyanophenylhydrazine hydrochloride in place of p-methoxyphenylhydrazine hydrochloride affords the corresponding 2-methyl-5-cyano-3-indolylacetic acid t-butyl ester.

EXAMPLE 9

The procedure of Example 3A is followed using an equivalent quantity of the t-butyl ester of the acid

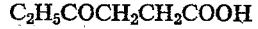
$C_2H_5COCH_2CH_2COOH$ in place of t-butyl levulinate to produce 2-ethyl-5-methoxy-3-indolylacetic acid t-butyl ester.

Similarly, equivalent quantities of the t-butyl esters of the acids $C_3H_7COCH_2CH_2COOH$ and

$C_4H_9COCH_2CH_2COOH$ used in place of t-butyl levulinate, afford the corresponding 2-propyl and 2-butyl-5-methoxy-3-indolylacetic acid t-butyl esters, respectively. Furthermore, the use of equivalent quantities of the other phenylhydrazine hydrochlorides described in Examples 3–8 in place of p-methoxyphenylhydrazine hydrochloride in this example, affords the corresponding 2-ethyl, 2-propyl and 2-butyl-5-substituted-3-indolylacetic acid t-butyl esters.

EXAMPLE 10

The procedure of Example 3A is followed using an equivalent quantity of t-butyl α-methyl levulinate in place of t-butyl levulinate to produce α-(2-methyl-5-methoxy-3-indolyl)propionic acid t-butyl ester. Similarly, equivalent quantities of t-butyl α-ethyl levulinate, t-butyl α-propyl levulinate and t-butyl α-butyl levulinate, used in place of t-butyl levulinate, afford the corresponding α-indolylbutyric, α-indolyl pentanoic, and α-indolylcaproic acid t-butyl esters, respectively.

Furthermore, the use of the phenylhydrazine hydrochlorides in Examples 3–8, other than p-methoxyphenylhydrazine hydrochloride, with the t-butyl esters of this example, in equivalent quantities, affords the corresponding α-(2-methyl-5-substituted-3-indolyl)aliphatic acid t-butyl esters.

EXAMPLE 11

The procedures of Examples 3A and 3B are followed using an equivalent quantity of triphenylmethyl levulinate in place of t-butyl levulinate to produce the respective triphenylmethyl esters of the corresponding 2-methyl-5-alkoxy-3-indolylacetic acids.

EXAMPLE 12

A mixture of 12.6 grams of p-methoxyphenylhydrazine-HCl and 10 grams of t-butyl levulinate in 50 ml. of benzene is refluxed overnight under nitrogen and then cooled to 25° C. The mixture is filtered, the filtrate concentrated in vacuo, and 20 ml. of cyclohexane added to the residual oil. The solution is cooled to 10° C., filtered and the resulting crystalline material dried in vacuo to yield 10.4 grams of the tertiary butyl ester of 2-methyl-5-methoxy-3-indolylacetic acid.

EXAMPLE 13

A mixture of 24.5 grams of p-methoxyphenylhydrazine-HCl and 20 grams of t-butyl levulinate in 100 ml. of isopropanol is refluxed under nitrogen for 4 hours. The mixture is filtered hot and the filtrate concentrated to about 35 ml. After cooling to 5° C., the resulting crystalline material is filtered off and then washed twice with 10 ml. portions of isopropanol followed by three washings with 10 ml. portions of petroleum ether. 14.62 grams of the tertiary butyl ester of 2-methyl-5-methoxy-3-indolylacetic acid are obtained (M.P.=107–110° C.).

EXAMPLE 14

Using the same procedures as in Examples 3A and 3B, but substituting equivalent quantities of the respective tertiary esters of levulinic acid, in which the $R_3$, $R_4$ and $R_5$ substituents are as tabulated below, for the t-butyl levulinate used therein, the corresponding 2-methyl-5-alkoxy-3-indolylacetic acid tertiary esters are obtained.

| $R_3$ | $R_4$ | $R_5$ |
|---|---|---|
| —$CH_3$ | —$CH_3$ | —$C_2H_5$ |
| —$C_2H_5$ | —$C_2H_5$ | —$C_2H_5$ |
| —$CH_3$ | —$CH_3$ | —$CH_2C(CH_3)_3$ |
| —$CH_3$ | —$CH_3$ | —$CH_2OCH_3$ |
| —$CH_3$ | —$CH_3$ | —$CH_2C_6H_5$ |
| —$CH_3$ | —$CH_3$ | —$C_6H_5$ |
| —$CH_3$ | —$CH_3$ | —$C_6H_4CH_3$ |
| —$CH_3$ | —$CH_3$ | —$C_6H_{11}$ |

Similarly, the use of an equivalent quantity of a tertiary ester of levulinic acid in which $R_3$ and $R_4$ are joined with the tertiary carbon atom of the ester component to form a cyclohexyl, cyclopentyl, 2-cyclohexenyl and 2-cyclopentenyl radical, respectively, and in which $R_5$ is a methyl radical, affords the corresponding 2-methyl-5-alkoxy-3-indolylacetic acid tertiary esters. Furthermore, the use in this procedure of equivalent quantities of the phenylhydrazine hydrochlorides used in Examples 3–8, other than p-methoxyphenylhydrazine hydrochloride, with the foregoing compounds, affords the corresponding tertiary indolyl acid esters.

EXAMPLE 15

Preparation of t-butyl 2,4,5-trimethyl-7-chloro-3-indolylacetate

A mixture of 20.7 grams of 2-chloro-4,5-dimethylphenylhydrazine-HCl and 20.0 grams of t-butyl levulinate in 100 ml. of t-butanol is refluxed for 6 hours. After cooling to 25° C., the resulting ammonium chloride is filtered off. The solvent is removed in vacuo and the crude t-butyl ester of 2,4,5-trimethyl-7-chloro-3-indolylacetic acid is recovered and purified as described in Example 3A.

Various changes and modifications may be made in carrying out the present invention without departing from the spirit and scope thereof. Insofar as these changes and modifications are within the purview of the annexed claims, they are to be considered as part of our invention.

We claim:
1. A process of preparing gamma keto acid tertiary alkyl esters having the formula:

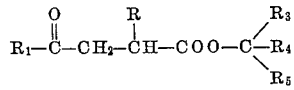

wherein R and $R_1$ are selected from the group consisting of a hydrogen atom and lower alkyl radicals; and each of $R_3$, $R_4$ and $R_5$ is an alkyl radical, which comprises treating a gamma keto acid chloride having the formula:

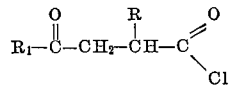

wherein R and $R_1$ are as previously defined, with an alkali tertiary alkoxide in anhydrous benzene.

2. A process of preparing tertiary butyl levulinate which comprises treating levulinyl chloride with an alkali tertiary butoxide in anhydrous benzene.

3. A process of preparing gamma keto acid tertiary alkyl esters having the formula:

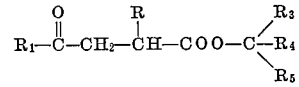

wherein R and $R_1$ are selected from the group consisting of a hydrogen atom and lower alkyl radicals; and each of $R_3$, $R_4$ and $R_5$ is an alkyl radical, which comprises treating a gamma keto acid chloride having the formula:

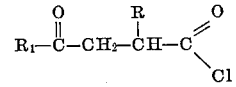

wherein R and $R_1$ are as previously defined, with a tertiary alkanol in an inert organic solvent in the presence of a halogen acid acceptor.

4. A process of preparing tertiary butyl levulinate which comprises treating levulinyl chloride with tertiary butanol in an inert organic solvent in the presence of a halogen acid acceptor.

References Cited

UNITED STATES PATENTS

| 2,948,747 | 8/1960 | Karbum et al. | 260—483 |
| 2,960,548 | 11/1960 | Ayers et al. | 260—483 XR |
| 3,082,246 | 3/1963 | Chafetz | 260—483 XR |
| 3,096,365 | 7/1963 | Heisler et al. | 260—483 XR |
| 3,160,655 | 12/1964 | Stoffel et al. | 260—483 |
| 3,167,578 | 1/1965 | Fernholz et al. | 260—483 XR |

FOREIGN PATENTS 658,413 10/1951 Great Britain.

OTHER REFERENCES

Cox et al.: J. American Chem. Soc., vol. 55, pp. 3391–3394 (1933).

Migrdichian: Organic Synthesis, vol. 1, pp. 319–320 (1957).

Fieser et ux.: Organic Chemistry, p. 180 (1944).

LORRAINE A. WEINBERGER, Primary Examiner

H. C. WEGNER, Assistant Examiner

U.S. Cl. X.R.

260—326.12, 326.13, 326.14; 280—389